United States Patent
Gretenkord (10) Patent No.: US 12,050,527 B2
(45) Date of Patent: Jul. 30, 2024

(54) METHOD FOR TESTING CONTROL SOFTWARE OF A CONTROL DEVICE

(71) Applicant: dSPACE GmbH, Paderborn (DE)

(72) Inventor: Joerg Gretenkord, Paderborn (DE)

(73) Assignee: DSPACE GMBH, Paderborn (DE)

( * ) Notice: Subject to any disclaimer, the term of this patent is extended or adjusted under 35 U.S.C. 154(b) by 286 days.

(21) Appl. No.: 17/621,262

(22) PCT Filed: Sep. 3, 2020

(86) PCT No.: PCT/EP2020/074568
§ 371 (c)(1),
(2) Date: Dec. 21, 2021

(87) PCT Pub. No.: WO2021/043887
PCT Pub. Date: Mar. 11, 2021

(65) Prior Publication Data
US 2022/0358028 A1 Nov. 10, 2022

(30) Foreign Application Priority Data
Sep. 6, 2019 (EP) .................................... 19195786

(51) Int. Cl.
*G06F 11/36* (2006.01)
*G06F 16/22* (2019.01)

(52) U.S. Cl.
CPC ...... *G06F 11/3664* (2013.01); *G06F 11/3688* (2013.01); *G06F 16/2246* (2019.01); *G06F 16/2264* (2019.01)

(58) Field of Classification Search
None
See application file for complete search history.

(56) References Cited

U.S. PATENT DOCUMENTS 10,447,496 B2 * 10/2019 Wang .................. H04L 12/4633

FOREIGN PATENT DOCUMENTS

| CN | 109 542 385 A | 3/2019 |
| EP | 2 942 678 A1 | 11/2015 |
| JP | 2006157266 A * | 6/2006 |

OTHER PUBLICATIONS

Mansmann Florian et al: "StreamSqueeze: a dynamic stream visualization for monitoring of event data", Visualization and Data Analysis 2012, SPIE, 1000 20th St. Bellingham WA 98225-6705 USA, Bd. 8294, No. 1, Jan. 22, 2012 (Jan. 22, 2012), pp. 1-12, XP060001023, DOI: 10.1117/12.912372 [found on Jan. 24, 2012].

(Continued)

*Primary Examiner* — Tuankhanh D Phan
(74) *Attorney, Agent, or Firm* — Leydig, Voit & Mayer, Ltd.

(57) ABSTRACT

The invention relates to a method for testing control software of a control device, the control device providing data streams (12) for evaluation, said method having the steps of: —generating a first and a second tree structure for displaying the data streams (12) in a display region in a table-like arrangement (10) having a plurality of rows (14) and a plurality of columns (16), wherein—the first tree structure comprises a first multidimensional list, —the first multidimensional list comprises a plurality of row element lists, —the row element lists comprise a plurality of elements (20), —each element (20) can be linked in the row element list to a data stream (12), —the element (20) specifies the column (16) in which the data stream (12) to which the element (20) can be linked is displayed; wherein—the second tree structure comprises a second multidimensional list, —the second multidimensional list comprises a plurality of column element lists, —the column element lists comprise the plurality of elements (20), —the element (20) specifies the row (14) in which the data stream (12) to which (Continued)

the element (20) can be linked is displayed; and—displaying the data streams (12) on the basis of the first and second tree structures.

16 Claims, 3 Drawing Sheets

(56) References Cited

OTHER PUBLICATIONS

University of Southern California: "CSCI 103—Homework 1", Introduction to Programming, Jan. 1, 2023 (Jan. 1, 2023), pp. 1-19, XP093079423, retrieved from internet: URL:https://bytes.usc.edu/cs103/assignments/hw1_.html [found on Sep. 6, 2023].

Macveigh Donal T.: "Effect of data representation on cost of sparse matrix operations", Acta Informatica, Jan. 1, 1977 (Jan. 1, 1977), pp. 361-394, Bd. 7, No. 4, Springer-Verlag, XP093079468, Berlin/Heidelberg, ISSN: 0001-5903, DOI: 10.1007/BF00289469, found in internet: URL:https://link.springer.com/content/pdf/10.1007/BF00289469.pdf?pdf=inline%20link.

* cited by examiner

METHOD FOR TESTING CONTROL SOFTWARE OF A CONTROL DEVICE

CROSS-REFERENCE TO PRIOR APPLICATIONS

This application is a U.S. National Phase application under 35 U.S.C. § 371 of International Application No. PCT/EP2020/074568, filed on Sep. 3, 2020, and claims benefit to European Patent Application No. EP 19195786.9, filed on Sep. 6, 2019. The International Application was published in German on Mar. 11, 2021 as WO 2021/043887 A1 under PCT Article 21(2).

FIELD

The invention relates to a method for testing control software of a control device, wherein the control device provides data streams for evaluation.

BACKGROUND

For functional tests of control software of control devices and in particular of electronic control devices, hardware in the form of the control device or in the form of a control device prototype can be used in principle and the control software tested in the real environment, for example during a test drive.

So-called hardware-in-the-loop (HiL) tests are also suitable, in which the control device is connected via inputs and outputs to an HiL simulator, wherein the HiL simulator emulates the real environment. The HiL simulator emulates the electrical signals from sensors and actuators that are read by the controller. For example, in an HiL test of an internal combustion engine, the signals from crankshaft and camshaft sensors are generated by an angular processing unit (APU) that is part of the hardware of the HiL simulator. On the basis of these signals, the control device in turn generates sensor and/or actuator control signals via the control software, which in turn lead to a change in the electrical signals in the HiL simulator.

In function tests of the control software, irrespective of its type, a plurality of signals is thus generated and transmitted, the temporal course of which is acquired in the form of data and/or data streams in order to enable detection of weak spots in the control software or to make improvements. For example, in function tests of the control software of a control device of a vehicle, up to 100,000 signals are transmitted from the vehicle to the control device. The analysis and evaluation of the data streams generally comprises a suitable graphical display of the data streams so that a user is given access to the data and can draw conclusions from the data. Since the data streams often comprise time-variable data, a graphical display of the data streams can reasonably be implemented only by displaying the data streams in a display area of a graphical user interface of a computer.

In applications on the computer that require a large number of displayed items in the display area, the problem can, however, arise that the operating system of the computer is no longer able to provide the necessary computing power, and the operating system crashes or at least new displayed items can no longer be generated in the display area. Furthermore, with the large number of data streams transmitted during testing of the control software, it is a challenge to keep a clear overview of the display of the data streams and still give the user the possibility of changing the display of the data streams for the purpose of analysis and evaluation of the data streams.

Such a problem arises, for example, in displaying data streams for real-time measurement data in hardware-in-the-loop applications. In this case, it is sometimes necessary to graphically display a large number of different data streams. In practice, it has been found that Microsoft Windows cannot fully utilize the application possibilities of visualization and experimentation software, such as the applicant's ControlDesk product, since the previously used management of the display of the data streams and also of the previously used way of generating the graphical display are not resource-saving enough and are thus too computationally intensive.

ControlDesk is a software application that is used, among other things, for visualizing bus systems, such as CAN, LINE, Flexray, and Ethernet on a computer system. In particular when used with Ethernet, very high data volumes are possible, as a result of which the analysis and evaluation of the data streams also requires a large number of graphical displayed items.

SUMMARY

In an exemplary embodiment, the present invention provides a method for testing control software of a control device. The control device provides data streams for evaluation. The method includes: generating a first tree structure and a second tree structure for displaying the data streams in a display area in a tabular arrangement comprising a plurality of rows and a plurality of columns; and displaying the data streams on the basis of the first and second tree structures. The first tree structure comprises a first multidimensional list, the first multidimensional list comprises a plurality of row element lists, the row element lists comprise a plurality of elements, and each element of the plurality of elements is linkable to a data stream and defines in which column the data stream to which the element is linkable is displayed. The second tree structure comprises a second multidimensional list, the second multidimensional list comprises a plurality of column element lists, the column element lists comprise the plurality of elements, and each element of the plurality of elements defines in which row the data stream to which the element is linkable is displayed.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the invention provide a method for testing control software of a control device, which method avoids the disadvantages described above. In particular, efficient and resource-saving access to the data streams provided by the control device are made possible.

According to the invention, a method for testing control software of a control device is thus provided, wherein the control device provides data streams for evaluation, comprising the steps of:
- generating a first and second tree structure for displaying the data flows in a display area in a tabular arrangement, comprising a plurality of rows and a plurality of columns, wherein
  - the first tree structure comprises a first multidimensional list,
  - the first multidimensional list comprises a plurality of row element lists,
  - the row element lists comprise a plurality of elements,
  - each element in the row element list can be linked to a data stream,
  - the element defines in which column the data stream to which the element can be linked is displayed, wherein
  - the second tree structure comprises a second multidimensional list,
  - the second multidimensional list comprises a plurality of column element lists,
  - the column element lists comprise the plurality of elements,
  - the element defines in which row the data stream to which the element can be linked is displayed, and
- displaying the data streams on the basis of the first and second tree structures.

Displaying the data streams is preferably understood to mean that the data streams are displayed graphically in such a form that a user of the method is informed about the data streams in this way and is given access to their values. The data streams preferably comprise time-varying data. The method thus makes it possible for the user to analyze and evaluate the data streams, for example when testing the control software of the control device.

The method according to the invention thus forms the basis for processing the data streams, wherein the method uses the performance of a computer efficiently and disadvantages, such as a crash of the operating system, are thus avoided. Furthermore, the method reduces the risk of the computing power not being sufficient to display a further data stream.

The method provides that the first and second tree structures are generated in order to display the data streams in the display area in the tabular arrangement. Said tree structures make it possible to generate and manage the tabular arrangement of the displays of the data streams in a particularly efficient manner. The first tree structure comprises the first multidimensional list. A list is to be understood as a data-structure variant in which many similarly structured data are accumulated, in the present case the row element lists. Access to similarly structured data, i.e., access to the row element lists, is effected with the aid of indices that indicate the position of the row element lists in the multidimensional list. In the present case, multidimensional means that the dimension of the list is greater than one. In other words, the first multidimensional list is at least a two-dimensional data structure. The first multidimensional list in turn comprises the plurality of row element lists. The row element lists are also lists. The similarly structured data of the row element lists are the elements, whereby elements can be linked to a data stream. In other words, the elements represent access to a specific data stream. The method now provides that in the first tree structure the respective element defines in which column of the tabular arrangement the data stream to which the element can be linked is displayed. In which column the data stream is displayed is thus not defined on the basis of the index of the element in the row element list, but it is rather the element itself which defines in which column the data stream that can be linked to the element is displayed. The order of the elements in the row element list is thus not decisive for displaying in the tabular arrangement. The length of the row element list also does not have to match the number of columns of the tabular arrangement. In particular, in tabular arrangements that have empty cells, the row element list may have a shorter length than the number of columns. Within the meaning of the invention, empty cells preferably means that no data stream is currently displayed in this cell of the tabular arrangement or that its display is hidden. Preferably, it is possible to define in the elements not only in which column the data stream that can be linked to the element is displayed, but also other properties of the display of the data stream.

Analogously to the first tree structure, the second tree structure provides that the element defines in which row the data stream to which the element can be linked is displayed. It is thus not defined on the basis of the index of the element in the column element list in which row the data stream, with which the element can be linked, is displayed, but rather the element itself defines in which row the data stream linkable to the element is displayed. The order of the elements in the column element list is thus not decisive for the display in the tabular arrangement. The length of the column element list also does not have to correspond to the number of rows in the tabular arrangement. In particular, in tabular arrangements that have empty cells, the column element list may have a shorter length than the number of rows.

The first and second tree structures thus enable a high degree of flexibility in the structure of the tabular arrangement, since the length of the row element list and the length of the column element list do not have to correlate with the number of rows and columns of the tabular arrangement. Likewise, the order of the elements within the row element list does not have to correlate with the order of the displays within a row of the tabular arrangement and the order of the elements within the column element list does not have to correlate with the order of the displays within a column of the tabular arrangement. This enables efficient management of the displayed data streams, since only those data streams actually displayed are managed. Empty cells, empty rows and/or empty columns in the tabular arrangement in particular do not result in memory being occupied.

In principle, the number of elements in the row element list corresponds to the number of data streams to be displayed or being currently displayed in the corresponding row of the arrangement and the number of elements in the column element list corresponds to the number of data streams to be displayed or currently being displayed in the corresponding column of the arrangement. However, the first and second tree structures enable a resource-saving management of the displays of the data streams since in a dynamic manner and without prior definition only the data streams of interest can be displayed and data transmission can be interrupted for data streams not being displayed. The method thus enables efficient and resource-saving access to the data streams provided by the control device.

With regard to the aforementioned efficient access to the data streams, a preferred embodiment of the invention provides that the element defines via a link status with the data stream whether data of this data stream are transmitted by the control device. Alternatively or additionally, in a preferred embodiment, the method comprises the following steps of:

linking the element to the data stream, and
transmitting the data from the control device for this data stream.

In other words, this preferably means that linking the element leads to the transmission of data of the data stream that can be linked to the element. Preferably, the link status indicates whether the element is currently linked to the data stream or the link to the data stream does not currently exist. In particular, it is provided that a user can change the link status of the element. Only when the data stream is currently linked to the element are the data for this data stream transmitted from the control device.

In this context, a further preferred embodiment of the invention provides that hiding a displayed data stream leads in the element to deletion of the link to the data stream linked to the element. The method thus preferably comprises the following steps: deleting in the element the link of the data stream linked to the element, and interrupting data transmission from the control device for this data stream. In this way, it is possible to hide or reveal and/or to close or open the display of the data stream in the tabular arrangement in the display area, which is particularly resource-saving. The data for the data stream are transmitted by the control device only when the element is linked to the data stream. As soon as a display of the data stream is no longer visible to the user, the linking of the element to the data stream is deleted and the data no longer transmitted. In particular, the general structure of the tabular arrangement is not influenced by hiding a display of a data stream in the tabular arrangement, since the element to which the data stream can be linked defines in which row or column the data stream is to be displayed. The element and through it the data stream that can be linked to the element thus retains its row-column relationship within the tabular arrangement, even when the data stream is not being displayed. This makes it possible to easily hide the displays of the data streams in the tabular arrangement. It is, therefore, not necessary to hide entire columns and/or rows. This enables the user to display in a clear manner, dynamically and row-by-row, only the data streams which are currently required for analysis and evaluation of the data. It is preferably provided that hiding and/or displaying or closing and/or opening a display of a data stream can be triggered by the user.

The first and second tree structures enable not only efficient access to the data streams provided by the control device, but also a clear tabular arrangement. In this connection, a preferred embodiment of the invention provides that a change in the tabular arrangement of the data streams by a user leads to a change in the first and/or second tree structures; a change in the display of a data stream in the tabular arrangement by a user leads to a change in the element linked to the data stream; a change in the first and/or second tree structure leads to a change in the tabular arrangement of the data streams; and/or a change in the element linked to the data stream leads in the tabular arrangement to a change in the display of the data stream linked to the element.

Changing the tabular arrangement by the user is preferably understood to mean that by his action the user effects a change in the tabular arrangement, for example by a drag-and-drop action. Changing the tabular arrangement is further preferably to be understood as a shifting of a display of a data stream from one cell into another cell. During a shift, the column and/or row relationships of the displays in the tabular arrangement change with respect to one another.

Furthermore, changing the tabular arrangement preferably means adding or removing displays of data streams. During addition or removal, the tabular arrangement is supplemented or reduced by further rows and/or columns. The rows and/or columns can preferably be added and/or removed not only at the edge of the tabular arrangement but also within the tabular arrangement. In other words, this means that, due to the first and second tree structures, it is not necessary to build up the displays of the data streams in the tabular arrangement on a row-by-row or column-by-column basis.

By adding or removing displays of data streams, the column and/or row relationships of the displays in the tabular arrangement can thus change with respect to each other. The changed column and/or row relationships of the displays in the tabular arrangement with respect to each other are preferably mapped in the first and/or second tree structures. The first and/or second tree structure is thus continuously maintained and at all times reflects the current tabular arrangement.

For example, if a further display of a data stream is added by the user, the corresponding row element list of the first tree structure is expanded by an element which is linked to this data stream. The same applies to the corresponding column element list of the second tree structure. It does not matter whether the additional element is added in the row element list or in the column element list at the beginning, at the end, or somewhere in the middle of the row element list or column element list. In other words, the index of the added element in the row element list or column element list is not relevant because the index does not define where the data stream linked to the element is displayed in the tabular arrangement.

When displays of data streams are shifted, it should be noted that the two tree structures do not necessarily change. For example, if a display of a data stream in a cell is shifted within the same row from one column to another column, nothing preferably changes in the corresponding row element list of the first tree structure since the display of the data stream is still in the same row of the tabular arrangement. Instead, in this example, the second tree structure changes since the data stream is now displayed in a different column. In the second tree structure, the element is therefore preferably removed from the column element list, which represents the previous column, but added to the column element list, which represents the current column.

A change in the element linked to the data stream preferably also occurs during a shift. In the above example, although nothing changes preferably in the corresponding row element list of the first tree structure, the element in the row element list that is linked to the data stream preferably does change. In this regard, the corresponding element preferably changes information that defines in which column the data stream linked to the element is displayed and adapts this information accordingly to the new column.

Changing the representation of the data stream in the tabular arrangement by the user is preferably understood to mean that the user, by his action, for example by a mouse movement or by a mouse click, causes the change in the display of the data stream. Changing the display of the data stream is further preferably to be understood as meaning the specific type of display of the data stream. This preferably comprises a height of the display, a width of the display, a color of the display, a resolution of the display, and/or a transparency of the display. Changing the display of the data stream thus preferably leads to a change in the element linked to the data stream. This also means, in particular, that changing the display of the data stream does not lead to a change in the first and/or second tree structure. It is preferably provided that the element that can be linked to the data stream comprises information regarding the type of display of the linkable data stream. This is preferably information regarding the height of the display, the width of the display, the color of the display, the resolution of the display and/or the transparency of the display. If the display of the data stream by the user is now changed, this information will preferably be updated in the element and matched to the values selected by the user. Furthermore, the element preferably comprises information regarding limit values for the height of the display, the width of the display, the resolution of the display, and/or the transparency of the display, which should not be exceeded and/or undershot. These limit values can be defined by the user or can be generated depending on the linkable data stream or the current value of the data stream.

So far it has been shown that the user can change the tabular arrangement of the data streams and/or the display of the data stream in the tabular arrangement and that this leads to a change in the first and/or second tree structure and/or to a change in the element. Conversely, however, a change in the first and/or second tree structure preferably also leads to a change in the tabular arrangement of the data streams. Furthermore, a change in the element linked to the data stream preferably leads to a change in the display of the data stream linked to the element in the tabular arrangement.

The method thus preferably comprises the additional steps of:
 changing the tabular arrangement of the data streams, and
 adjusting the first and/or second tree structure to the changed tabular arrangement, and/or
 changing the first and/or second tree structure
 adjusting the tabular arrangement of the data streams to the changed first and/or second tree structures.

More preferably, the method thus comprises the additional steps of:
 changing the display of the data stream in the tabular arrangement, and
 adjusting the element linked to the data stream to the changed display, and/or
 changing the element linked to a data stream, and
 adjusting in the tabular arrangement the display of the data stream linked to the element to the changed element.

Changing the element may preferably be caused by the data stream linked to the element. Preferably the step comprises changing the element linked to the data stream, i.e. changing the element linked to the data stream on the basis of a current value of the data stream linked to the element. For example, the height of the display of the data stream may be dynamically adjusted to the current value of the data stream. In particular, the tabular arrangement can be generated dynamically from the data streams provided by the control device.

As already mentioned, it is preferably provided that the element comprises information regarding the type of display of the data stream that can be linked to the element. In this context, a preferred embodiment of the invention provides that the element defines the height and/or width of the display of the data stream to which the element can be linked and/or the method additionally comprises the following steps:
 defining the height and/or width of the display in the element of the data stream linked to the element, and
 displaying with this height and/or width the data stream linked to the element.

Defining the height and/or width of the display in the element of the data stream linked to the element preferably comprises a definition of values as a function of the data stream linked to the element or the received data. Alternatively or additionally, the height and/or width can also be defined by the user. According to a preferred embodiment of the invention, it is thus provided that the user can define the height and/or width of the display in the element of the data stream that can be linked to the element, and/or the method additionally comprises the following steps:
 defining on the part of the user a width and/or height of the display in the element of the data stream linked to the element, and
 displaying with this width and/or height the data stream linked to the element.

Furthermore, as already mentioned, the height and/or width cannot only be defined but can also be changed. The user changing the display of the data stream in the tabular arrangement thus preferably comprises the user changing the height and/or width. Furthermore, the height and/or width change can take place dynamically. The method preferably comprises the following step:
 changing a height and/or width of the display of the data stream linked to the element, or
 changing a height and/or width of the display of the data stream linked to the element on the basis of a current value of the data stream linked to the element.

When changing the height of the display of the data stream linked to the element, it is possible in principle for only this one display to change and for further display of data streams in the tabular arrangement not to be affected by this change. However, it is preferably provided that when the height of the display of a data stream in the tabular arrangement changes, the height of the row of the tabular arrangement in which the data stream is displayed will adjust itself. This is preferably done by all displays of data streams present in this row likewise changing height. According to a preferred embodiment of the invention, it is accordingly provided that changing a height of the display of the data stream linked to the element to a future height comprises the following steps:
 determining further elements linked to data streams in the row of the tabular arrangement of the data stream shown, doing so via the row element list of the first tree structure,
 requesting height requirements for the determined further elements linked to data streams,
 comparing the requested height requirements of the further elements linked to data streams to the future height, returning an adjusted future height for the display of the data stream linked to the element, on the basis of the height requirements, defining the height of the display in the element of the data stream linked to the element on the basis of the returned adjusted future height, changing the height of the display of all data streams shown in the row to the defined height.

The first tree structure thus enables an efficient and resource-saving change in the height of the display and the height of the corresponding row, since the elements that are affected by the change in height can be identified via the row element list. In these elements, the height requirements for the displays of the data streams linked to these elements are requested. In this sense, height requirements are preferably to be understood as meaning a lower or upper limit value for the height of the displays of the data streams. If there is no clash between the future height and the height requirement, the return of the adjusted future height will preferably comprise a return of the future height for the display of the data stream linked to the element. For example, if none of the other elements specifies a height requirement, this corresponds to the release of the requested future height.

The same preferably applies to a change in width. It is thus preferably provided that, when the width of the display of a data stream in the tabular arrangement changes, the width of the column of the tabular arrangement in which the data stream is displayed adjusts itself. This is preferably done by also changing the width of all displays of data streams present in this column. According to a preferred embodiment, changing the width of the display of the data stream linked to the element to a future width comprises the following steps:

determining further elements linked to data streams in the column of the tabular arrangement of the data stream shown via the column element list of the second tree structure, requesting width requirements for the determined further elements linked to data streams, comparing to the future width the width requirements of the further elements linked to data streams, returning an adjusted future width for the display of the data stream linked to the element on the basis of the width requirements, defining the width of the display in the element of the data stream linked to the element on the basis of the returned adjusted future width, changing the width of display of all data streams displayed in the column to the defined width.

The generation of the first and second tree structures thus enables a resource-saving display of data streams in the tabular arrangement, wherein, due to the first and second tree structures, the tabular arrangement of the displays and also the displays of the data streams themselves are very flexible. The clarity of the display of the data streams is thus maintained and the user continues to be given the possibility of changing the display of the data streams for the purpose of analysis and evaluation of the data streams. In this context, a preferred embodiment of the invention provides that the element can be linked to a further first and second tree structure for representing data streams, and/or that the method additionally comprises the following steps:

linking the element to a further first tree structure and a further second tree structure for displaying data streams, and displaying the data streams on the basis of the further first and second tree structures in a further tabular arrangement within a cell of the tabular arrangement.

The element can thus preferably be linked not only to a data stream but also to the further first and second tree structures. This further first tree structure is structured analogously to the first tree structure, and the further second tree structure is structured analogously to the second tree structure. The further first and the further second tree structures thus in turn again comprise further elements which can be linked to data streams. The further tabular arrangement can thus be generated within the cell of the tabular arrangement. Such a "table in the table" can also be understood as a three-dimensional table. Generating the further tabular arrangement within the cell of the tabular arrangement does not just increase flexibility. The three-dimensional table offers advantages, in particular in combination with the display of data streams in which some displays of data streams are hidden and/or collapsed. It is preferably provided that when displays are hidden and/or collapsed the contents of an underlying tabular arrangement become visible. In the further tabular arrangement within the cell of the tabular arrangement, it is thus preferable to understand underlying as referring to the cell of the tabular arrangement.

A further preferred embodiment of the invention provides that the method additionally comprises the following steps:

continuously transmitting the data from the control device for data streams linked to an element, updating on the basis of the transmitted data the display of the data streams in the display area in the tabular arrangement.

Continuous transmission of the data means that new data are repeatedly transmitted by the control device, for example current measurement data. This transmission can take place continuously, for example, in a pre-specified cycle or in an event-oriented manner. The displays of the data streams are continuously updated on the basis of the transmitted data. For example, the height of the display is dynamically adjusted to the current measured value, or if a measured value no longer changes over a long period of time, the display of this data stream can be hidden. This hiding in turn preferably leads to the deletion of the link of the element to which the data stream is linked so that data transmission for this data stream is interrupted.

The method can be used for quite different applications. According to a preferred embodiment of the invention, the method is used for testing the control software of a vehicle control device in hardware-in-the-loop applications. Further preferably, the display area is used for displaying the data streams of measurement data instruments for real-time measurement data in hardware-in-the-loop applications.

The invention is explained in more detail below with reference to a preferred exemplary embodiment with reference to the drawings.

Figure 1:
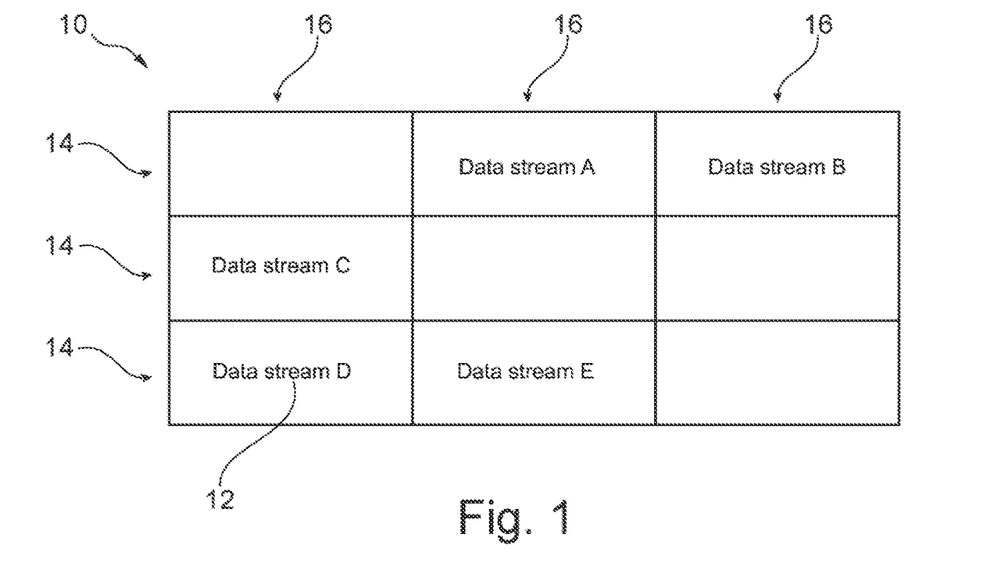
FIG. 1 schematically shows a tabular arrangement in a display area for displaying data streams, according to a preferred exemplary embodiment of the invention.

FIG. 1 schematically shows a tabular arrangement 10 in a display area for displaying data streams 12 according to a preferred exemplary embodiment of the invention. The tabular arrangement 10 has a plurality of rows 14 and a plurality of columns 16. In the present exemplary embodiment, there are three rows 14 and three columns 16. In total, five data streams 12, namely data streams A to E, are displayed in the tabular arrangement 10. In order to display the data streams 12 in the tabular arrangement 10, it is provided that a first tree structure and a second tree structure are generated.

The first tree structure comprises a first multidimensional list, which in turn comprises a plurality of row element lists. The row element list in turn comprises a plurality of elements 20. The elements 20 can each be linked to a data stream 12. In order to make the linkability of the element 20 to a specific data stream 12 from FIG. 1 recognizable for the reader, the elements 20 are hereinafter referred to as elements A to E, analogous to the data streams A to E. In particular, it is provided that the element 20 defines in which column 16 the data stream 12 to which the element 20 can be linked is displayed in the tabular arrangement 10. The defining of the column 16 in the element 20 is hereinafter indicated by a subscript, bold and underlined number following the name of the element 20.

The following first tree structure is generated for the tabular arrangement 10 shown in FIG. 1:

First multidimensional list:
<RowElementList<Element $A_{1,2}$, Element $B_{1,3}$>>)
<RowElementList<Element $C_{2,1}$>>)
<RowElementList<Element $D_{3,1}$, Element $E_{3,2}$>>)

In the first tree structure, the length of the row element list thus does not match the number of columns 16 of the tabular arrangement 10. Namely, three columns 16 are shown In FIG. 1, but the length of the row element list is either one element long or two elements long.

As already mentioned, generation of the second tree structure generated is also provided for displaying the data streams 12 in the tabular arrangement 10. The second tree structure comprises a second multidimensional list, which in turn comprises a plurality of column element lists. The column element lists in turn comprise the plurality of elements 20. In particular, it is provided that the element 20 defines on which row 14 the data stream 12 to which the element 20 can be linked is displayed in the tabular arrangement 10. The defining of row 14 in element 20 is hereinafter indicated by a subscript, bold and underlined number following the element name.

For the tabular arrangement 10 shown in FIG. 1, the following second tree structure is generated:

Second multidimensional list:
<ColumnElementList<Element $C_{2,1}$, Element $D_{3,1}$>>)
<ColumnElementList<Element $A_{1,2}$, Element $E_{3,2}$>>)
<ColumnElementList<Element $B_{1,3}$>>)

In the second tree structure, the length of the column element list thus does not match the number of rows 14 of the tabular arrangement 10. Namely, three rows 14 are shown in FIG. 1, but the length of the column element list is either one element long or two elements long.

Figure 2:
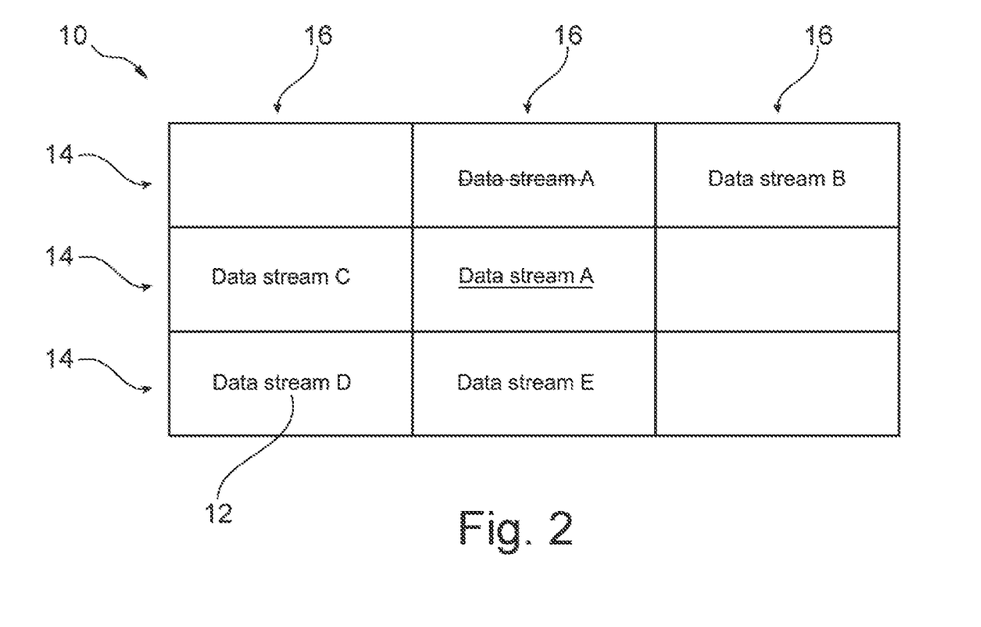
FIG. 2 schematically shows the tabular arrangement in the display area for displaying data streams, according to a further preferred exemplary embodiment of the invention.

FIG. 2 also schematically shows a tabular arrangement 10 in a display area for displaying the data streams 12, wherein the display of the data stream A has been shifted by the user within the tabular arrangement 10 in FIG. 2 as compared to FIG. 1. In FIG. 1, the display of the data stream A is located in the first row 14 and in the second column 16. In FIG. 2, the display of the data stream A is located in the second row 14 and in the second column 16. The shifting of the display of the data stream A is indicated in FIG. 2 by a crossed-out and an underlined data stream A.

In this example, changing the tabular arrangement 10 of the data streams 12 by the user leads to a change in the first tree structure. The second tree structure on the other hand remains in this example the same as for FIG. 1 since the display of the data stream A is still located in the second column 16:

First multidimensional list:
<RowElementList<Element B>>)
<RowElementList<Element C, Element A>>)
<RowElementList<Element D, Element E>>)

Second multidimensional list:
<ColumnElementList<Element C, Element D>>)
<ColumnElementList<Element A, Element E>>)
<ColumnElementList<Element B>>)

The order of the elements 20 in the row element list is not decisive for the order in which the data streams 12 are displayed in the corresponding column 16 of the tabular arrangement 10. Similarly, the order of the elements in the column element list is not decisive for the order in which the data streams 12 are displayed in the corresponding row 14 of the tabular arrangement 10.

Figure 3:
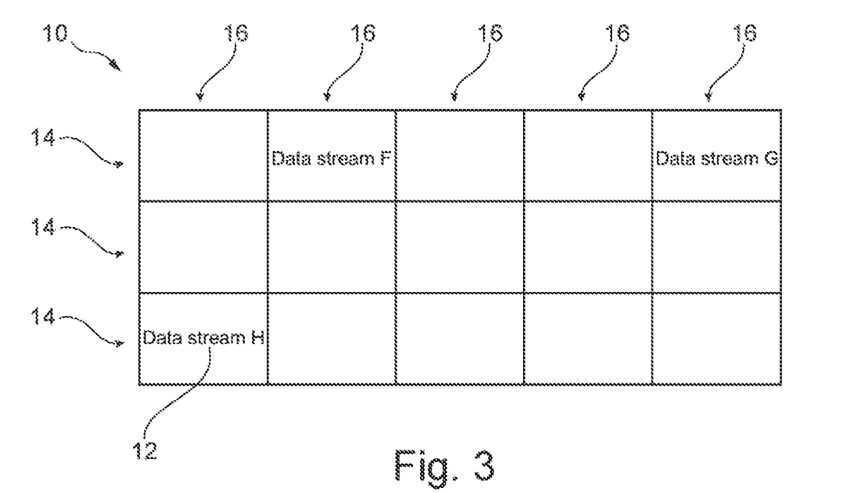
FIG. 3 schematically shows the tabular arrangement in the display area for displaying data streams, according to a further preferred exemplary embodiment of the invention.

FIG. 3 also schematically shows a tabular arrangement 10 in a display area for displaying the data streams 12, wherein the data streams F to G are shown here. The tabular arrangement 10 in FIG. 3 has three rows 14, wherein no data stream 12 is shown in the second row 14. Furthermore, the tabular arrangement 10 in FIG. 3 has five columns 16, wherein no data stream 12 is shown in the third and fourth columns 16.

The first and second tree structures for the tabular arrangement in FIG. 3 correspond to the following:

First multidimensional list:
<RowElementList<Element $F_{1,2}$, Element $G_{1,5}$>>)
<RowElementList<Element $H_{3,1}$>>)

Second multidimensional list:
<ColumnElementList<Element $H_{3,1}$>>)
<ColumnElementList<Element $F_{1,2}$>>)
<ColumnElementList<Element $G_{1,5}$>>)

The first and second tree structures thus do not have to reflect the dimension of the tabular arrangement 10. In FIG. 3, the tabular arrangement 10 has a dimension of three×five, in other words, 15. The first and second tree structures do not create a separate list for the empty row 14 and the empty column 16, so that memory space is saved. Furthermore, the tabular arrangement 10 can thus be expanded flexibly without the first and/or second tree structure expanding significantly. For example, an additional display of a data stream 12 can be added in the 100th row 14 (not shown in FIG. 3) so that the tabular arrangement 10 would then have five hundred cells. For this purpose, however, the first and/or second tree structure does not have to be expanded by 485 elements, but only by one.

Figure 4:
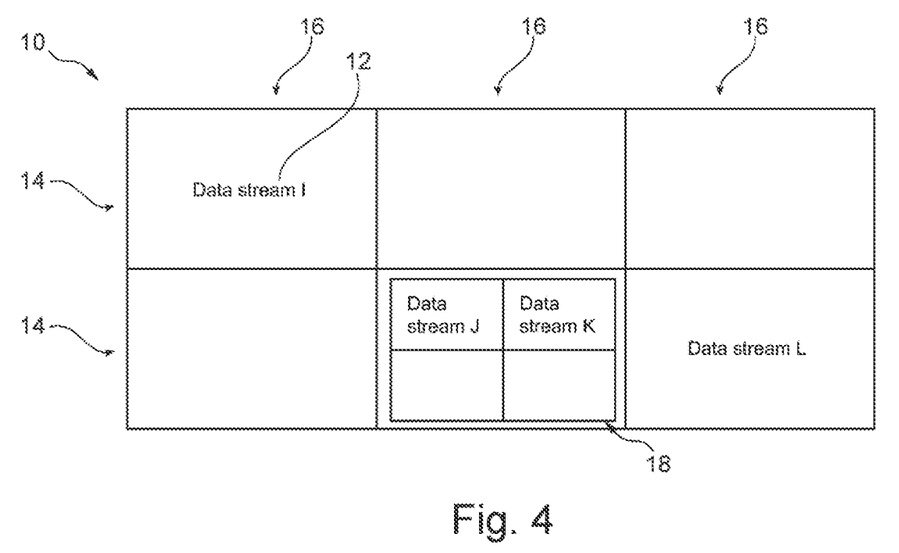
FIG. 4 schematically shows the tabular arrangement in the display area for displaying data streams, according to a further preferred exemplary embodiment of the invention.

FIG. 4 shows a further schematic tabular arrangement 10 with the data streams I to L. In this case, the tabular arrangement 10 has a table in the table, that is to say, a nested structure. There is a first tabular arrangement 10 which has two rows 14 and three columns 16. In the cell in the second row 14 and the second column 16, a further tabular arrangement 18 having two rows and two columns is shown. Such a nested arrangement can be generated and managed very easily via the tree structures. It is generated by the element 20 not being linked to a data stream but rather to a further first tree structure and a further second tree structure. This link of element 20 to a tree structure is represented below by "VB". The following first and second tree structures are generated for the tabular arrangement in FIG. 4:

First multidimensional list:
<RowElementList<Element $I_{1,1}$>>)
<RowElementList<Element $VB_{2,2}$, Element $L_{2,3}$>>)

Second multidimensional list:
<ColumnElementList<Element $I_{1,1}$>>)
<ColumnElementList<Element $VB_{2,2}$>>)
<ColumnElementList<Element $L_{2,3}$>>)

The element "Element VB" linked to the further first tree structure and to the further second tree structure is in the row element list and column element list. For the further tabular arrangement 18 in FIG. 4, the further first tree structure and the further second tree structure to which the element VB is connected look as follows:

Further first tree structure with further first multidimensional list:
    <RowElementList<Element $J_{1,1}$, Element $K_{1,2}$>>)

Further second tree structure with further second multidimensional list:
    <ColumnElementList<Element $J_{1,1}$>>)
    <ColumnElementList<Element $K_{1,2}$>>)

Figure 5:
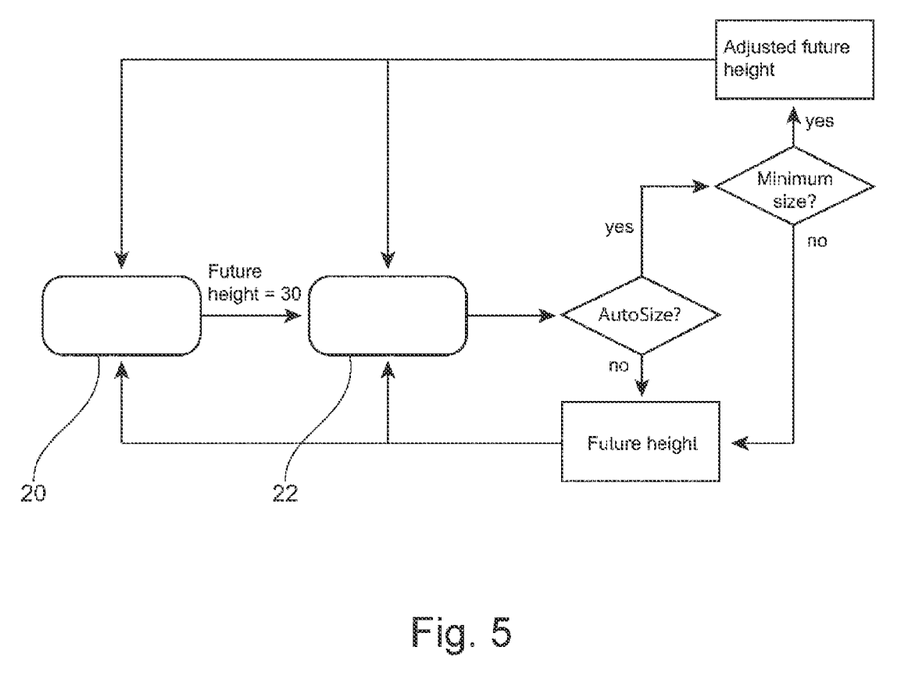
FIG. 5 schematically shows a flow chart for changing a height of the display of the data stream in the tabular arrangement, according to a further preferred exemplary embodiment of the invention.

FIG. 5 shows an exemplary schematic flow diagram for changing a height of the display of the data stream 12 in the tabular arrangement 10 according to a further preferred exemplary embodiment of the invention. If a display of a data stream 12 is to change its height, the element 20 linked to this data stream 12 asks its parent 22 whether it can change the height of the display of the data stream 12. In the present case, the parent 22 designates the data object that creates the tabular arrangement 10. The parent 22 is thus also the data object that generates and optionally updates the first and second tree structures. In the present example, the element 20 asks the parent 22 whether the height of the display of the data stream 12 linked to the element 20 can be changed to a future height of 30. Via the first tree structure, the parent 22 can directly and in a resource-saving manner query properties and conditions for the further elements 20 of the corresponding row 12. Changing the height of the display of a data stream 12 to the future height thus comprises a first step in which the row element list of the first tree structure is determined, which further elements 20 linked to data streams 12 are shown in the row 14 of the tabular arrangement 10 of the data stream 10 shown. In a further step, height requirements are queried for these determined further elements 20 linked to data streams 12. Each element 20 respectively contains information regarding the type of display of the linkable data stream 12, which also relate to the height of the display. In the present example, the information items "AutoSize" and "MinimumSize" are requested as height requirements. The information item MinimumSize specifies the minimum size of the display of the data stream 12, while the information item AutoSize specifies the hidability of the data stream 12 in a true/false value. If no other element 20 requires that the data stream 12 linked to the element 20 cannot be hidden, the future height will be released directly. Alternatively, the future height is compared with the queried minimum size and, if necessary, an adjusted future height is returned. The method thus comprises the step of returning the adjusted future height for the display of the data stream linked to the element, doing so on the basis of the height requirements. Finally, only one element 20 is actually adjusted and the further elements 20 go along with the proposal without requiring further data traffic. For this purpose, the parent 22 calculates corresponding differences and forwards the information. The row 14 is thus shifted below the affected row 14, which is to be reduced, by the difference between the previous height of the upper row 14 and the future height of the upper row 14, without further requests to individual elements 20, in order to make as little communication as possible necessary.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Tabular arrangement
12 Data stream
14 Row
16 Column
18 Further tabular arrangement
20 Element
22 Parent

The invention claimed is:

1. A method for generating multidimensional lists for facilitating tabular display of data streams relating to testing control software of a control device, the method comprising:
    displaying a table having a plurality of rows and a plurality of columns, wherein the table has a plurality of cells, wherein each cell is located at an intersection between a respective row and a respective column, and wherein the displayed table includes multiple cells displaying information relating to respective data streams and at least one empty cell;
    wherein to generate the displayed table, the method further comprises:
        generating a first multidimensional list comprising a plurality of row element lists, including a first row element list corresponding to a first row of the table and a second row element list corresponding to a second row of the table; and
        generating a second multidimensional list comprising a plurality of column element lists, including a first column element list corresponding to a first column of the table and a second column element list corresponding to a second column of the table;
    wherein data stream information displayed in the first row of the table has one or more corresponding entries in the first row element list;
    wherein data stream information displayed in the second row of the table has one or more corresponding entries in the second row element list;
    wherein data stream information displayed in the first column of the table has one or more corresponding entries in the first column element list;

wherein data stream information displayed in the second column of the table has one or more corresponding entries in the second column element list; and wherein empty cells in the first row, the second row, the first column, and/or the second column do not have corresponding entries in the first and second row element lists and the first and second column element lists.

2. The method according to claim 1, wherein respective elements of the row element lists and the column element lists define via a link status with a respective data stream whether data of the respective data stream are transmitted by the control device.

3. The method according to claim 1, wherein hiding a respective displayed data stream leads to deletion of a respective entry in a respective row element list and a respective entry in a respective column element list.

4. The method according to claim 1, wherein:
a change in an arrangement of the data streams in the displayed table by a user leads to a change in the first first multidimensional list and/or the second multidimensional list; and/or
a change in the first first multidimensional list and/or the second multidimensional list leads to a change in the arrangement of data streams in the displayed table.

5. The method according to claim 1, wherein respective elements of the row element lists and the column element lists define height and/or width of respective corresponding cells of the displayed table.

6. The method according to claim 1, further comprising:
changing a height and/or a width of a cell of the displayed table.

7. The method according to claim 1, further comprising:
changing a height of a cell in the first row of the displayed table to a future height, wherein changing the height comprises:
  determining, via the first row element list, further entries in the first row element list;
  requesting height requirements for the determined further entries;
  comparing the requested height requirements of the determined further entries to the future height;
  returning an adjusted future height based on the height requirements;
  defining the height of the cell based on the returned adjusted future height; and
  changing the height of all cells in the first row to the defined height.

8. The method according to claim 1, further comprising:
changing a width of a cell in the first row of the displayed table to a future width, wherein changing the width comprises:
  determining, via the first column element list, further entries in the first row element list;
  requesting width requirements for the determined further entries;
  comparing the width requirements of the determined further entries to the future width;
  returning an adjusted future width based on the width requirements;
  defining the width of the cell based on the returned adjusted future width; and
  changing the width of all cells in the first column to the defined width.

9. The method according to claim 1, wherein a further table is displayed within a respective cell of the displayed table, wherein the further table is generated based on a further first multidimensional list and a further second multidimensional list.

10. The method according to claim 1, further comprising:
continuously transmitting data from the control device information relating to a plurality of data streams; and
updating, on the basis of the transmitted data, cells of the table corresponding to the plurality of data streams.

11. The method according to claim 1, wherein the information displayed in the table is from measurement data instruments for real-time measurement data in hardware-in-the-loop applications.

12. The method according to claim 1, further comprising:
transmitting data from the control device for a respective data stream for which information is displayed in the table.

13. The method according to claim 1, further comprising:
interrupting data transmission from the control device for a respective data stream based on an entry corresponding to the respective data stream being deleted.

14. The method according to claim 1, further comprising:
defining a height and/or a width for a respective cell of the table; and
displaying the respective cell with the defined height and/or the defined width.

15. The method according to claim 1, further comprising:
displaying a further table having information of multiple data streams within a single respective cell of the displayed table.

16. A non-transitory computer-readable medium having processor-executable instructions stored thereon, wherein the processor-executable instructions, when executed, facilitate performance of a method for generating multidimensional lists for facilitating tabular display of data streams relating to testing control software of a control device, the method comprising:
displaying a table having a plurality of rows and a plurality of columns, wherein the table has a plurality of cells, wherein each cell is located at an intersection between a respective row and a respective column, wherein each cell either displays information relating to one or more respective data streams or is an empty cell, and wherein the displayed table includes multiple cells displaying information relating to respective data streams and at least one empty cell;
wherein to generate the displayed table, the method further comprises:
  generating a first multidimensional list comprising a plurality of row element lists, including a first row element list corresponding to a first row of the table and a second row element list corresponding to a second row of the table; and
  generating a second multidimensional list comprising a plurality of column element lists, including a first column element list corresponding to a first column of the table and a second column element list corresponding to a second column of the table;
wherein data stream information displayed in the first row of the table has one or more corresponding entries in the first row element list;
wherein data stream information displayed in the second row of the table has one or more corresponding entries in the second row element list;
wherein data stream information displayed in the first column of the table has one or more corresponding entries in the first column element list;

wherein data stream information displayed in the second column of the table has one or more corresponding entries in the second column element list; and wherein empty cells in the first row, the second row, the first column, and/or the second column do not have corresponding entries in the first and second row element lists and the first and second column element lists.

\* \* \* \* \*